Figure 1:
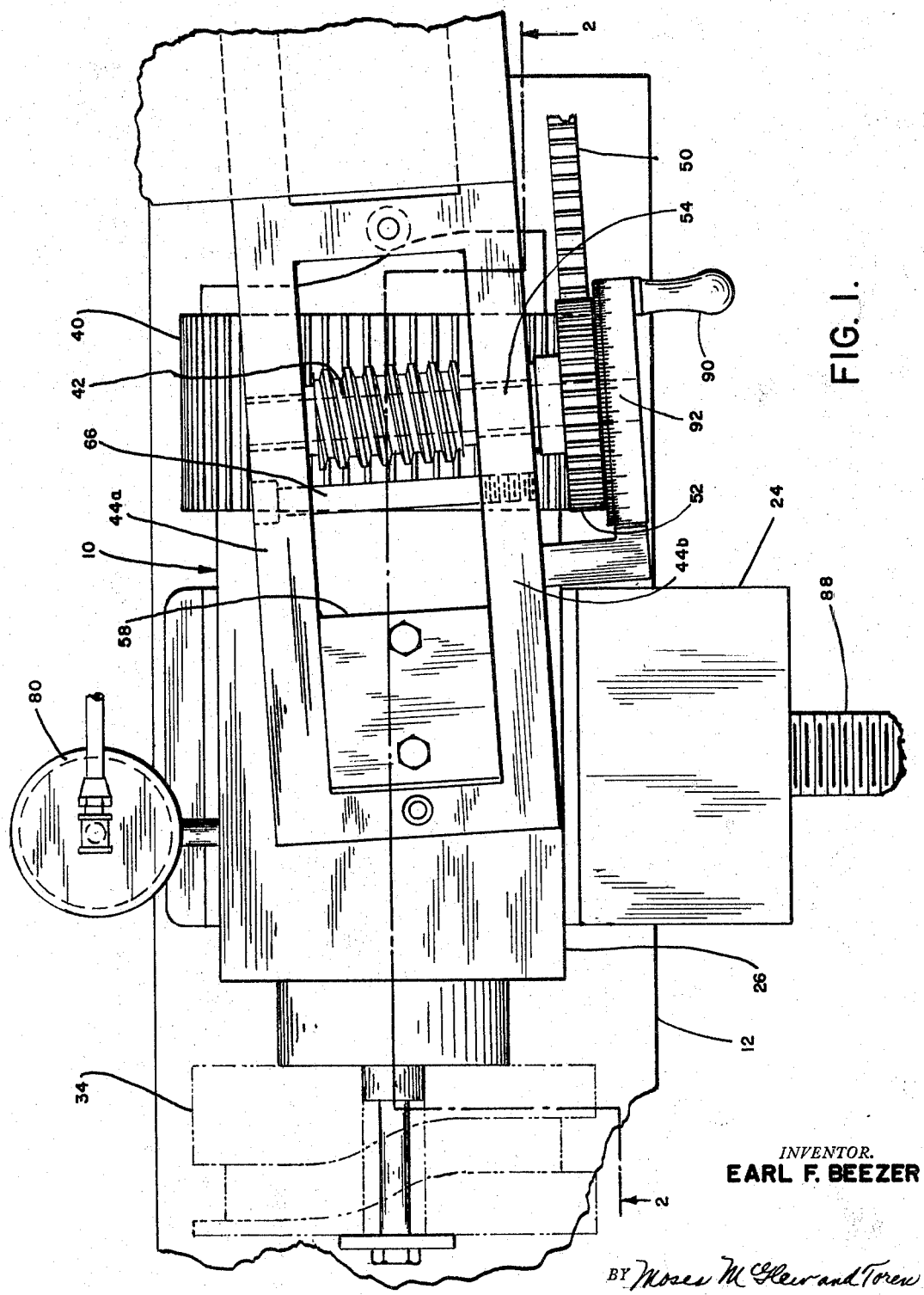

April 4, 1967    E. F. BEEZER    3,312,145
CAM CUTTING DEVICE
Filed Aug. 13, 1965    2 Sheets-Sheet 1

INVENTOR.
EARL F. BEEZER
BY Moses M. Glew and Toren
ATTORNEYS

United States Patent Office 3,312,145
Patented Apr. 4, 1967

3,312,145
CAM CUTTING DEVICE
Earl F. Beezer, E-75 Hemlock Drive,
Paramus, N.J. 07652
Filed Aug. 13, 1965, Ser. No. 479,432
11 Claims. (Cl. 90—13.9)

This invention relates, in general, to a machine for forming cams and, in particular, to a new and useful machine for milling or grinding cams of a cylindrical type in which the cam is mounted on a cylindrical member which is moved in relation to a cutter by means of a control cam which is also carried by the member and which is biased against the control cam by fluid pressure.

The present invention is an improvement in machinery for milling or grinding cams of a cylindrical type, either those having a groove for positive constraint of a roller follower or those havng an end profile over which the follower is directed. The present invention is an improvement over the prior art, particularly in respect to the provision of a simple machine construction or adapter for existing milling machines which makes it possible to mill or grind cylindrical-type cams in a simple and easy manner and with the utmost accuracy. The invention provides, in a simple manner, means for mounting a cam blank or workpiece on a movable mounting member and for controlling the movement of the movable member either manually, or automatically under the control of a control cam by a variable speed motor driving through a worm and spur gear secured on the movable member.

In accordance with the invention, the machine advantageously includes a cylinder housing in which is slidable a piston member or workpiece mounting member. The mounting member includes a cylindrical extension or mounting shaft portion having means for mounting a cam blank to be machined. The piston member projects outwardly from one end of the cylinder and carries a spur gear thereon which is driven by a worm from a variable speed motor. Control for the axial displacement movement of the member in respect to a horizontally fixed rotatable cutter is effected by a control cam which is secured to the outwardly extending end of the piston member. The control cam on the piston member is biased into engagement with a stationary follower by fluid pressure which is advantageously admitted behind the piston in the cylinder housing to cause engagement of the cam and follower member for the controlled axial displacement of the piston member. The piston member includes means on one end for mounting a cylindrical blank beneath the cutter in order to effect the cutting of a desired profile in accordance with the characteristics of the master or control cam.

A further feature of the invention is that the device may be used for manual cutting of a cam by locking the forward extension of the piston member in relation to the housing and by adjusting the position of a housing with a manual control such as hand wheel in respect to positioning in respect to the cutter for successive cutting or forming.

Accordingly, it is an object of the invention to provide an improved machine for cutting and forming cylindrical cams in which the cam blank to be cut is carried on a piston member which is displaceable by the action of controlled means including a master or control cam and follower, and is rotated through a gearing carried directly on the piston member driven through a worm gear actuated by a variable speed motor.

A further object of the invention is to provide a cam cutting, milling or grinding machine in which the cam blank to be cut, the control cam or the follower, and the main driving or rotating shaft or mounting member for the cam to be cut are assembled together and movable together so that the relationship of the cam blank and the control or master cam are independent of any gearing relationship.

A further object of the invention is to provide a machine for the cutting of cylindrical cams which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
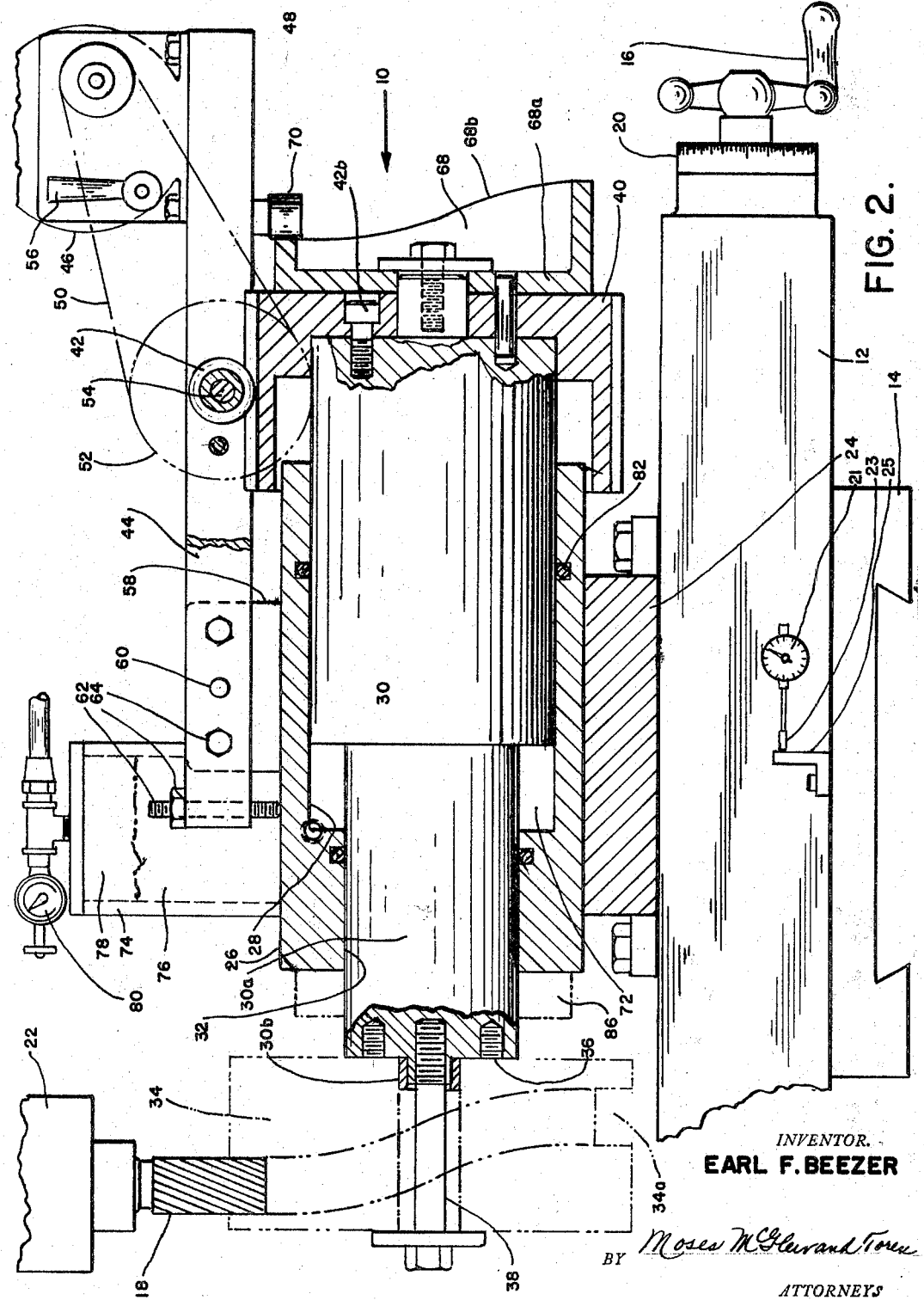

In the drawings:

FIG. 1 is a partial top plan view of a cam milling or grinding machine constructed in accordance with the invention; and FIG. 2 is a section taken along the line 2—2 of FIG. 1.

Referring to the drawings, in particular, the invention as embodied therein comprises a cam milling or grinding unit 10 which in the embodiment illustrated is mounted on a movable carriage or milling table 12 which is displaceable on a fixed base 14 upon rotation of a hand wheel 16. Accurate positioning of the carriage 12 in respect to a rotatable cutter 18, also supported on base 14, may be effected by the hand wheel 16 using an accurate scale 20 for indicating displacement. The rotary cutter 18 is mounted in an arm member 22 having motor and gear means for rotating the cutter at a desired speed. The arm 22 may be positioned upwardly or downwardly in respect to the carriage 12. Displacement of the carriage 12 may also be indicated by a dial indicator 21 which is affixed to the carriage and carries a movable sensing arm 23 which engages an abutment 25 on the base 14.

In accordance with the invention, the cam milling or grinding unit 10 includes a mounting plate or milling vise 24 provided with flanges for bolting the plate in a fixed position after it is adjusted on the carriage 12. A cylindrical housing or workpiece mounting member 26 is affixed to the mounting plate 24 and it is provided with a cylindrical bore 28 in which is slidable a piston or mounting member 30. A cylindrical mounting shaft or rod portion 30a of the piston 30 extends through an opening 32 in one end of the cylindrical housing 26 and it is provided with a threaded end portion 30b for receiving a workpiece or cam blank indicated in dotted lines 34. The workpiece 34 to be machined may be secured to the mounting member 30 by additional means such as bolt elements threaded into threaded bores 36 at the end of the rod portion 30a. In addition, a clamping bolt 38 is directed through a center bore of the workpiece 34 and is threaded into the end of the rod portion 30a.

In accordance with a feature of the invention, the mounting member 30 is rotated and moved axially under the control of gear and cam means which are carried thereby for facilitating the cutting of the cam groove 34a (or end profile in the case of an ordinary cylinder cam) by the rotatable cutter 18 which is located in a fixed horizontal position. For this purpose, the cylindrical housing 26 is opened at its outer end and the piston member 30 projects outwardly therefrom and driving gear means including a spur gear 40 is affixed to the outer end by bolts 42b. Spur gear 40 includes external annular gear teeth which surround the outer end of the member 30 and are engaged by a driving worm 42. The gear teeth of spur gear 40 are elongated in a longitudinal machine direction to insure engagement with the worm 42 during movement of the workpiece mounting member. The worm 42 is mounted on an adjustably positionable bracket member or worm mounting member 44 and it is driven from a variable speed motor 46 through a controlled motor pulley 48, driving belt 50, and a worm pulley 52 which is mounted on the worm shaft 54. The speed of the motor 46 may be controlled in both rotational directions in a simple manner through a lever control 56.

In accordance with a further feature of the invention, the bracket 44 is made in the form of a frame with spaced leg portions 44a and 44b which provide a rotatable mounting for each end of the worm shaft 54. The bracket 44 is carried on an upstanding securing cleat or bracket element 58 which is disposed at an angle to the housing and to the piston member 30 and which is comparable to the helix angle of the worm gear 42. The bracket 44 is designed to hold the worm gear 42 in precise meshing engagement with the spur gear 40 during all phases of movement of the mounting member 30.

Means are provided for eliminating all clearance between the worm 42 and the spur gear 40. The bracket 44 is initially positioned on the bracket mounting member 58 so that it pivots about a pivot pin 60 to permit positioning of the worm 42 by engagement with the spur gear 40. An adjusting bolt element or screw member 62 is threaded into a bolt member 64 and its outer end bears against the housing 26. The bolt member 62 may be adjusted in order to vary the position of the worm 42. After the adjustment is made, the bracket is secured in an adjusted position by tightening bolt elements 64.

Axial play of the worm 42 is removed by tightening and adjusting bolt member 66 (see FIG. 1) which is positioned in the frame portion 44a and is threaded in the frame portion 44b. Tightening of the bolt members 66 causes a slight distortion of the frames 44a and 44b and eliminates any axial shake of the worm 42. The adjustment of the worm 42 in respect to axial shake and also its adjustment in respect to positioning on a gear 40 is necessary in order to eliminate any unconstrained movement between the worm and the spur gear during the cutting action. During operation, the worm will advance along the spur gear 40 without any variation in movement from the ideal involute tooth action movement between the worm teeth and the spur gear teeth.

A further feature of the invention is the provision of control cam means which provide for a controlled axial displacement of the mounting member 30 for displacing the workpiece 34 in relation to the cutter 18 to effect the cutting of the desired cam profile. In the embodiment illustrated, the cam means include a master or control cam 68 which advantageously comprises a cylindrical cam having an end portion 68a which is bolted on to the outer end of the spur gear 40, which, in turn, is bolted to the mounting member 30. The master cylinder cam 68 controls the movement of the member 30 when the member 30 is rotated by the spur gear 40 due to the action of the roller follower 70 riding on the surface 68b of the cam. The roller follower 70 is mounted in a fixed position on the bracket 44. It should be appreciated, however, that it is also possible to mount the roller follower on the mounting member 30 and to permit it to move over a cylinder cam which is mounted in a stationary manner adjacent the end of the mounting member to effect the same axial displacement of the mounting member 30.

A further feature of the invention is that the mounting member 30 is biased into engagement with the control cam means by fluid pressure which is admitted into the cylinder 26 into one end or pressure chamber 72 defined between the end face of the mounting member 30 and the associated end of the cylindrical member 26. In the embodiment illustrated, this fluid pressure is sufficient to urge the master cam 68 against the tracing roller 70. Optimum biasing or control pressure is obtained by maintaining the desired pressure on a fluid cylinder or reservoir 74. In the embodiment illustrated, the cylinder 74 is filled with a hydraulic fluid 76 which is maintained under pressure by air admitted under pressure at the upper portions 78. It is advantageous to place a hydraulic flow control valve (not shown) between the housing 26 and the reservoir 80 to permit a predetermined or controlled volume of fluid to pass therebetween in any given time period in order to prevent surging due to the reaction of heavy cutting forces. The pressure in the reservoir 74 is controlled by a pressure regulating means including a indicator gauge 80. A liquid such as hydraulic oil is preferable for admission from the cylinder 74 to the chamber 72 in the cylindrical member 26 in order to maintain optimum conditions of movement of the mounting member 30 when milling light and heavy cuts on the workpiece 34. The hydraulic liquid may still be used even where the only source of pressure is air, since the air may be used to pressurize the cylinder or reservoir 74 containing the hydraulic liquid. A liquid such as oil is preferable since it is relatively incompressible and may absorb operating forces, since the thrusts from the cutting forces may be in either direction, depending on rotation of the cutter or the workpiece at the various cycles of operation. In addition, it provides lubrication for the movable parts.

A feature of the fluid pressure control of the mounting member is that it provides non-vibrating restraint when cutting thrust would cause the main rod portion 30a and the master cam 68 to move away from the roller 70. In addition, the oil provides lubrication for the rotational and axial movement of the rod portion 30a and the mounting member 30. Loss of the oil is prevented by the use of O-rings 82.

The cam milling and grinding device 10 may be operated in the manner indicated in the drawing for cutting a workpiece 34 of the type illustrated to effect the cutting of a cam groove 34a or it may be used to cut a cylindrical cam having an end cam surface (not shown). The operation may be carried out automatically to effect the cutting of a groove or end profile 34a which is comparable to the configuration or outline 68b on the master or control cam 68. When such cutting is to be done automatically, it is merely necessary to mount the workpiece 34 in the position indicated in respect to the cutter 18 and to regulate the speed of rotation of the mounting member 30 and thus the workpiece 34 through the motor speed control lever 56. The axial advance of the workpiece will be governed by the configuration of the cam 68b and will be in timed relationship to the rotation of the gear 40, since each is mounted on the mounting member 30.

In the event that manual operation is desired, the mounting member 30 is anchored in respect to the housing 26 by a suitable anchoring collar 86 which has been indicated in dotted outline in FIG. 2. The anchoring collar 86 includes means (not shown) for connecting it to the rod portion 30b or the housing 26, or both, and it insures that the mounting member 30 and its rod portion 30a will be held stationary in respect to the cylindrical housing 26. Axial movement of the mounting member 30 may also be prevented by securing collar 86 only to the rod portion 30a and exerting hydraulic pressure in the chamber 72 to urge the collar against the end of housing 26. Rotation is still possible by means of the spur gear 40 and the worm drive 42. By progressively rotating the hand wheel 16 and a hand wheel 90 affixed to worm shaft 54 to various positions corresponding to specific angles and depth of cut on the cam which will be cut and causing the intermittent plunging of the cutter 18 vertically downwardly toward the workpiece after each proper rotational and axial displacement is set, it is possible to cut a single cam element or master cam surface in such a manner. The precise angular displacement may be read on a scale 92 and the precise axial displacement may be read by the dial 21 and by the indicator 20. The cutting of the cam profile by this manual operation will result in scallops being formed between successive cuts which can be removed by filing or grinding smooth after the cutting operation is completed. Master cam 68 outside diameter is relatively fixed to contact roller 70. However, the cam, being cut is not limited in outside diameter and can vary between very large limits.

Thus, it is possible with the invention to produce cams in production by an automatic operation or to produce a single or master cam by a manual operation. The device 10 may be incorporated with a conventional vertical milling machine or with a grinder head or may be mounted as a separate machine unit. The mounting plate 24 is advantageously mounted in a slidable manner on the carriage 12 and may be removed therefrom by rotation of a vise screw 88. The variable speed motor drive is advantageously such that rotation may be effected in either direction or disengagement of the motor drive may be effected by shifting lever 56 to a neutral position.

While a specific embodiment of the invention has been shown and described in detail to illustrate the application of the inventive principles, it will be understood that the invention may be embodied otherwise without departing from such principles.

What is claimed is:

1. A cam forming machine comprising a rotatable cutter, a cylindrical housing, a workpiece mounting member rotatable in said housing having means thereon for mounting a workpiece for operation thereon by said cutter, means mounting said workpiece mounting member for movement toward and away from said cutter, cam control means for moving said mounting member toward and away from said cutting including a control cam and a follower one of which is mounted in a fixed position and the other of which is carried by said mounting member, means to rotate said mounting member at a definite predetermined speed including a gear mounted on said mounting member and a driving worm engaged therewith, means rotatably mounting said worm for adjustable positioning in respect to said gear, and fluid pressure means connected to said mounting member and acting thereon to urge said follower into cooperative engagement with said control cam as said mounting member is moved by cooperative engagement thereof.

2. A forming machine particularly for milling and grinding cylindrical cams comprising, a cylindrical housing, a mounting member for a workpiece having a piston portion rotatably and axially slidable in said housing and having a workpiece mounting shaft portion extending through one end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a gear connected to the end of said mounting member which extends through the opened end of said housing, cam means for displacing said mounting member with the workpiece thereon in axial directions in respect to said cutter means including a cylindrical control cam and a follower connected to said mounting member, and fluid pressure means to urge said mounting member in a direction for engagement of said control cam and follower during rotation of said mounting member.

3. A cam cutting machine particularly for milling and grinding cylindrical cams comprising a cylindrical housing having a first end with an opening therein and a second opposite opened end, a mounting member for a workpiece having a piston portion rotatably and axially slidable in said housing and extending out through the second opened end and having a smaller diameter workpiece mounting shaft portion extending through the opening in said first end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a spur gear connected to the end of said mounting member which extends through the opened end of said housing and surrounding a portion of said mounting member, a driving worm engaged with said spur gear, cam means for displacing said mounting member with the workpiece thereon in axial directions in respect to said cutter means including a cylindrical control cam and a follower connected to the end of said mounting member which extends through the second opened end of said housing, and fluid pressure means to pressurize said cylindrical housing behind said piston portion to urge said mounting member in a direction for engagement of said control cam and follower during rotation of said mounting member.

4. A cam cutting machine particularly for milling and grinding cylindrical cams comprising a cylindrical housing having a first end with an opening therein and a second opposite opened end, a mounting member for a workpiece having a piston portion rotatably and axially slidable in said housing and extending out through the second open end and having a smaller diameter workpiece mounting shaft portion extending through the opening in said first end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a spur gear connected to the end of said mounting member which extends through the opened end of said housing and surrounding a portion of said mounting member, a driving worm engaged with said spur gear, cam means for displacing said mounting member with the workpiece thereon in axial directions in respect to said cutter means including a cylindrical control cam connected to the end of said mounting member which extends through the second opened end of said housing and a fixed tracing roller, and fluid pressure means to pressurize said cylindrical housing behind said piston portion to urge said mounting member in a direction for engagement of said cam means during rotation of said mounting member and to cause said cylindrical control cam to be urged into engagement with said tracing roller including a liquid reservoir for hydraulic liquid connected to said cylindrical housing and means to pressurize said liquid reservoir.

5. A cam cutting machine particularly for milling and grinding cylindrical cams comprising a cylindrical housing having a first end with an opening therein and a second opposite opened end, a mounting member for a workpiece having a piston portion rotatably and axially slidable in said housing and extending out through the second opened end and having a smaller diameter workpiece mounting shaft portion extending through the opening in said first end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a spur gear connected to the end of said mounting member which extends through the opened end of said housing and surrounding a portion of said mounting member, a driving worm engaged with said spur gear and variable speed motor means to rotate said worm, cam means for displacing said mounting member with the workpiece thereon in axial directions in respect to said cutter means including a cylindrical control cam connected to the end of said mounting member which extends through the second opened end of said housing and a fixed tracing roller, and fluid pressure means to pressurize said cylindrical housing behind said piston portion to urge said mounting member in a direction for engagement of said cam means during rotation of said mounting member and to cause said cylindrical control cam to be urged into engagement with said tracing roller, including a liquid reservoir for hydraulic liquid connected to said cylindrical housing and means to pressurize said liquid reservoir.

6. A cam cutting machine particularly for milling and grinding cylindrical cams comprising a cylindrical housing having a first end with an opening therein and a second opposite opened end, a mounting member for a workpiece having a piston portion rotatably and axially slidable in said housing and extending out through the second opened end and having a smaller diameter workpiece mounting shaft portion extending through the opening in said first end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a spur gear connected to the end of said mounting member which extends through the opened end of said housing and surrounding a portion of said mounting member, a driving worm engaged with said spur gear, cam means for displacing said mounting member with the workpiece thereon in axial directions in respect to said cutter means including a cylindrical control cam and a follower connected to the end of said mounting member which extends through the second opened end of said housing, fluid pressure means to pressurize said cylindrical housing behind said piston portion to urge said mounting member in a direction for engagement of said control cam and follower during rotation of said mounting member, a mounting frame for rotatably mounting said worm including spaced frame arm portions rotatably carrying said worm, a bracket pivotally supporting said frame intermediate its length on said cylindrical housing, and a set screw on said frame engageable with said housing for controlling the pivot location of said frame with said worm gear and means for bolting said frame in an adjusted position.

7. A cam cutting machine particularly for milling and grinding cylindrical cams comprising a cylindrical housing having a first end with an opening therein and a second opposite opened end, a mounting member for a workpiece having a piston portion rotatably and axially slidable in said housing and extending out through the second opened end and having a smaller diameter workpiece mounting shaft portion extending through the opening in said first end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a spur gear connected to the end of said mounting member which extends through the opened end of said housing and surrounding a portion of said mounting member, a driving worm engaged with said spur gear, variable speed motor means to rotate said worm, cam means for displacing said mounting member with the workpiece thereon in axial directions in respect to said cutter means including a cylindrical control cam connected to the end of said mounting member which extends through the second opened end of said housing and a fixed tracing roller, fluid pressure means to pressurize said cylindrical housing behind said piston portion to urge said mounting member in a direction for engagement of said cam means during rotation of said mounting member and to cause said cylindrical control cam to be urged into engagement with said tracing roller, a liquid reservoir for hydraulic liquid connected to said cylindrical housing, means to pressurize said liquid reservoir, a mounting bracket frame for said worm including spaced frame arm portions rotatably carrying said worm, a bracket supporting said frame on said cylindrical housing, and adjusting bolt means for clamping the opposite arms of said frame for holding said worm between said arms in a shakeless manner.

8. A cam cutting machine particularly for milling and grinding cylindrical cams comprising a cylindrical housing having a first end with an opening therein and a second opposite opened end, a mounting member for a workpiece having a piston portion rotatably and axially slidable in said housing and extending out through the second opened end and having a smaller diameter workpiece mounting shaft portion extending through the opening in said first end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a spur gear connected to the end of said mounting member which extends through the opened end of said housing and surrounding a portion of said mounting member, a driving worm engaged with said spur gear, variable speed motor means to rotate said worm, cam means for displacing said mounting member with the workpiece thereon in axial directions in respect to said cutter means including a cylindrical control cam connected to the end of said mounting member which extends through the second opened end of said housing and a fixed tracing roller, fluid pressure means to pressurize said cylindrical housing behind said piston portion to urge said mounting member in a direction for engagement of said cam means during rotation of said mounting member and to cause said cylindrical control cam to be urged into engagement with said tracing roller, means mounting said cylindrical housing for displacement toward and away from said cutter, and hand wheel control means for shifting said mounting means for carrying the position of a workpiece on said mounting member in respect to said cutter.

9. A cam cutting machine particularly for milling and grinding cylindrical cams comprising a cylindrical housing having a first end with an opening therein and a second opposite opened end, a mounting member for a workpiece having a piston portion rotatably and axially slidable in said housing and extending out through the second opened end and having a smaller diameter workpiece mounting shaft portion extending through the opening in said first end of said cylindrical housing with means on its outer end for mounting a workpiece thereon, cutter means adjacent the outer end of said workpiece mounting shaft for acting on a workpiece carried thereon, driving gear means connected to said mounting member for rotating said member to effect rotation of the workpiece in respect to said cutter means including a spur gear connected to the end of said mounting member which extends through the opened end of said housing and surrounding a portion of said mounting member, a driving worm engaged with said spur gear, cam means for displacing said mounting member with the workpiece thereon in axial directions in respect to said cutter means including a cylindrical control cam and a follower connected to the end of said mounting member which extends through the second opened end of said housing and a fixed tracing roller, and means to pressurize said cylindrical housing behind said piston portion to urge said mounting member in a direction for engagement of said cam means during rotation of said mounting member and to cause said cylindrical control cam to be urged into engagement with said tracing roller, means mounting said cylindrical housing for displacement toward and away from said cutter, and hand wheel control means for shifting said mounting means for carrying the position of a workpiece on said mounting member in respect to said cutter, and means for locking said mounting member in respect to said cylindrical housing for permitting the manual advance thereof in respect to said cutter.

10. A cam cutting device for use with a machine including cutter means mounted for vertical displacement in respect to a work station comprising a cylindrical housing having a first end with an opening therein and a second opposite end which is opened, a workpiece mounting member having a piston portion rotatably and axially slidable in said housing and extending out through the second opened end thereof and having a smaller diameter workpiece mounting shaft portion extending through the opening in the first end of said cylindrical housing with means on its outer end for mounting a workpiece thereon, driving gear means connected to said mounting member for rotating said member to effect rotation of the workpiece in respect to said cutter means including a spur gear connected to the end of said mounting member which extends out through the opened end of said housing, said spur gear surrounding a portion of said mounting member, a driving worm engaged with said spur gear, and variable speed motor means to rotate said worm, cam means for displacing said mounting member in an axial direction in respect to said cutter mean including a cylindrical control cam connected to the end of said mounting member which extends out through the second opposite end of said housing and a fixed tracing roller, means mounting said fixed tracing roller adjacent said cylindrical control cam, and means to pressurize said cylinder to urge said mounting member in a direction for engagement of said cam means during rotation of said mounting member to force said cylindrical cam into engagement with said tracing roller.

11. A forming machine comprising a cutter, a rotatable workpiece mounting member having means thereon for mounting a workpiece for operation thereon by said cutter, means mounting said workpiece mounting member for movement toward and away from said cutter, cam control means for moving said mounting member toward and away from said cutter including a control cam and a follower one of which is mounted in a fixed position and the other of which is carried by said mounting member, means to rotate said mounting member at a definite predetermined speed including an external gear surrounding said mounting member and a driving gear engaged with said external gear to rotate said external gear with said mounting member, said driving gear and said external gear being of a construction to permit rotation of said external gear and axial movement of said external gear while engaged with said driving gear, and fluid pressure means connected to said mounting member and acting thereon to urge said follower into cooperative engagement with said control cam as said mounting member is moved by cooperative engagement thereof.

References Cited by the Examiner

UNITED STATES PATENTS 3,224,340  12/1965  Wahlstrom _____ 90—13.7

FOREIGN PATENTS 252,186  9/1948  Switzerland.

WILLIAM W. DYER, JR., *Primary Examiner.*

G. A. DOST, *Assistant Examiner.*